United States Patent [19]

Rollins et al.

[11] Patent Number: 4,635,663
[45] Date of Patent: Jan. 13, 1987

[54] SELF-CONTAINED, SINGLE-USE HOSE AND TUBING CLEANING MODULE

[75] Inventors: Fred P. Rollins; James S. Glass, both of Las Cruces, N. Mex.

[73] Assignee: The United States of America as represented by the Administrator of the National Aeronautics and Space Administration, Washington, D.C.

[21] Appl. No.: 783,886

[22] Filed: Oct. 3, 1985

[51] Int. Cl.⁴ .............................................. B08B 3/10
[52] U.S. Cl. ................................. 134/93; 134/166 C; 210/282
[58] Field of Search ............... 210/663, 668, 694, 749, 210/806, 807, 85, 198.1, 202, 203, 206, 259, 266, 282–284, 287; 134/18, 42, 93, 201, 166 C, 169 C; 4/256

[56] References Cited

U.S. PATENT DOCUMENTS

| | | | |
|---|---|---|---|
| 1,049,808 | 1/1913 | Calhoun | 134/93 |
| 1,605,749 | 11/1926 | McCarthy | 134/93 |
| 1,774,004 | 8/1930 | Haslett . | |
| 1,814,572 | 7/1931 | Shaffer . | |
| 1,821,789 | 9/1931 | Borgeson | 134/93 |
| 2,764,452 | 9/1956 | Anderson et al. | 299/83 |
| 2,772,002 | 11/1956 | Mauro | 210/169 |
| 2,869,724 | 1/1959 | McDevitt | 210/94 |
| 3,038,610 | 6/1962 | Hetherington | 210/96 |
| 3,169,112 | 2/1965 | Nelson | 210/266 |
| 3,439,809 | 4/1969 | McPherren | 210/249 |
| 3,519,134 | 7/1970 | Hassinger | 210/282 |
| 3,554,377 | 1/1971 | Miller | 210/283 |
| 3,869,382 | 3/1975 | Tejeda | 210/30 |
| 4,287,057 | 9/1981 | Stanley | 210/85 |
| 4,368,123 | 1/1983 | Stanley | 210/269 |
| 4,555,347 | 11/1985 | O'Dowd et al. | 210/283 |

*Primary Examiner*—Ivars Cintins
*Attorney, Agent, or Firm*—Hardie R. Barr; John R. Manning; Marvin F. Matthews

[57] ABSTRACT

A self-contained, single-use hose and tubing cleaning module which utilizes available water supplies without requiring access to precision cleaning facilities. The module is attached to the water source at the inlet side and to the hose or tubing to be cleaned at the outlet side. The water flows through a water purification zone, a detergent dispensing zone and a filtration zone before the detergent-laden water flows into the tubing to clean the tubing walls. The module contains an embedded pad which is impregnated with a pH indicator to indicate to the user when the detergent has dissolved and rinsing of the tubing begins.

7 Claims, 2 Drawing Figures

SELF-CONTAINED, SINGLE-USE HOSE AND TUBING CLEANING MODULE

ORIGIN OF THE INVENTION

The invention described herein was made in the performance of work under a NASA contract and is subject to the provisions of Section 305 of the National Aeronautics and Space Art of 1958, Public Law 85-568 (72 Stat. 435; 42 U.S.C. 2457).

TECHNICAL FIELD

The invention relates to an apparatus or device for cleaning hoses or tubes in the field.

Hoses and tubing used in the field require periodic cleaning. This cleaning cannot always be performed easily because disassembly of the hoses and tubing may be required as well as the necessity to use cleaning water of unknown or questionable quality. Further, in such instances, cleaning is made difficult by the need for knowledgeable personnel using cleaning instruments to not only conduct the cleaning itself but to survey the water source.

BACKGROUND ART

Under the prior art, U.S. Pat. No. 2,868,724 (McDevitt) discloses a device for filtering and demineralizing water on a batch scale, containing inter alia, ion exchange resin and filters. A color indicator mark on the container signals need for replacement when color of effluent water matches color of the indicator mark.

U.S. Pat. No. 3,038,610 (Hetherington) discloses a deionization unit containing as an ion exchange resin a material having "high-swelling" properties which, upon a change in the pH of the liquid passing therethrough, swells to block the flow indicating exhaustion of the ion exchange capacity of the resin.

U.S. Pat. No. 4,287,057 (Stanley) discloses a portable water conditioner comprising, in addition to the usual inlet/outlet fixtures: screens, activated charcoal and ion exchange resins. It also includes an indicator which signals when a predetermined mass of filtrates has accumulated. A companion patent, U.S. Pat. No. 4,368,123 also to Stanley, discloses a simplified and improved apparatus for regeneration of the ion exchange resins such as those described in U.S. Pat. No. 4,287,051.

U.S. Pat. No. 3,519,134 (Hassinger) discloses a water treatment apparatus attachable to a faucet to improve the taste of water containing screens, activated charcoal, sand and limestone particles. U.S. Pat. No. 1,774,004 (Haslett), U.S. Pat. No. 2,772,002 (Mauro) and U.S. Pat. No. 3,439,809 (McPherren) disclose apparatus having various combinations of screens, filters, activated charcoal, and ion exchange resins for the filtering or treating of water.

Nowhere is disclosed the combination of water purification in the same module with a powdered cleaning compound which dissolves into the water leaving the filter as a cleaner.

It is an object of this invention to provide apparatus for field cleaning of hoses or tubing with minimum disassembly and reassembly of the hoses or tubing being cleaned. It is a further object of this invention to provide an apparatus for field cleaning of hoses or tubing which uses available water sources for the water to be used in cleaning the hoses or tubing.

It is a further object of this invention to provide an apparatus which can be used by relatively unskilled or low skilled personnel in performing the task of cleaning field hoses or tubing and disposed of when cleaning is completed.

DISCLOSURE OF THE INVENTION

The apparatus of this invention is a portable, compact module usually made of a polyethylene (or other polymer) tube for attachment to a water tap at the inlet end and an adapter to receive tube or hose for the specific application at the outlet end. The inlet end adapter is connected at the water tap and the water then flows through the device where it is filtered and demineralized through ion exchange in a purification zone and absorbs a powdered cleaning compound in a detergent disposing zone and exits the module from a filtration zone to enter the hose or tubing to be cleaned.

The practice of this invention allows use of existing water sources to clean hoses and tubing without disassembly of the hoses and tubing. The mere insertion of the module of this invention between the water source and the tubing to be cleaned provides economical as well as precise cleaning of hoses and tubing. Once cleaning is accomplished, the module is removed, the tubing and/or other equipment is reconnected into place.

The cleansed water, after the ion exchange in the purification zone, becomes laden with detergent and, after passing through the filters, flows through the hose or tube and cleaning same by detergent action. The water flow may be stopped at any time to permit a soaking period. Generally, the water is allowed to flow until all of the cleaner is exhausted at which time the embedded chemical indicator will change color in response to a change in pH of the water. When the indicator spot has changed, no more cleaning compound is flowing and the water is rinsing the hose or the tube.

DETAILED DESCRIPTION

The following detailed description more particularly describes the invention.

In its most detailed embodiment, the water flows from the inlet end and passes through in series a mesh retaining screen to prevent entry of large particles; then a zone of activated carbon particles for the removal of organic material from the water; a second retaining screen; a zone containing ion exchange resin granules for removal of dissolved minerals; a third retaining screen; a zone containing water soluble powdered cleaning compound; a fourth retaining screen; a stack of filters of decreasing size containing an embedded chemical indicator to show when the cleaning powder is exhausted.

Figure 1:
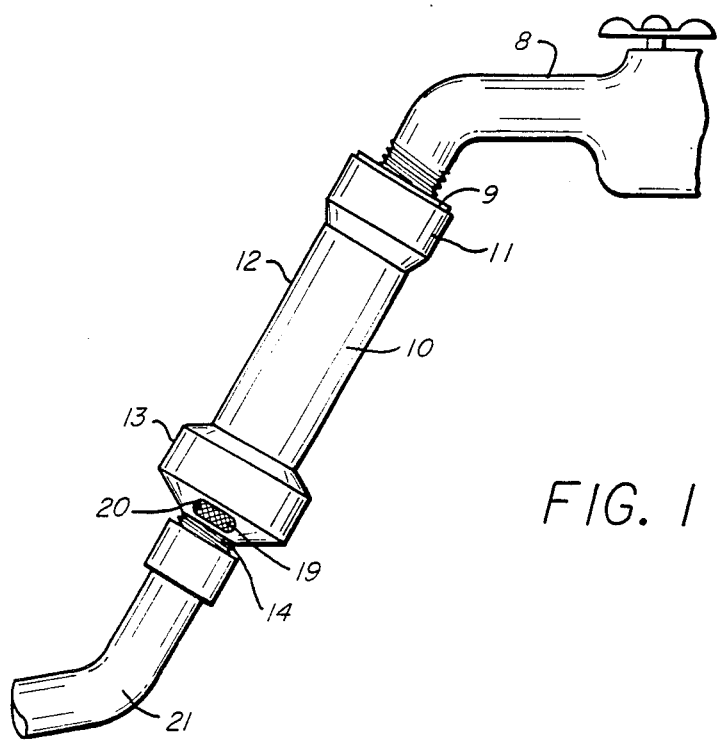
FIG. 1 shows the cleaning module of the invention connected to a water source and hose to be cleaned.

Referring to the drawings, FIG. 1, the tube cleaning module 10 of the invention comprises inlet fitting 11 attached to a water source 8 through an optional bushing 9, a body 12, an enlarged diameter filter holder 13, and fitting for outlet hose attachment 14 attached to the hose on tube to be cleaned. The module 10 is usually cylindrical in shape and preferably made of polyethylene or a similar polymer. This material is relatively inexpensive and appropriate for a disposable device. With simple modifications, a reusable device could be constructed. Whether disposable or reusable, the material must be of sufficient strength to withstand the pressures the water will exert.

The water source may be tap water from a standard municipal supply system or well water, or any other suitable supply which will not be overly polluted and is supplied at sufficient pressure. Outlet hose attachment 14 is connected to the hose or tube 21 to be cleaned. The water source 8 is then opened so that water flow starts and cleaning begins.

Figure 2:
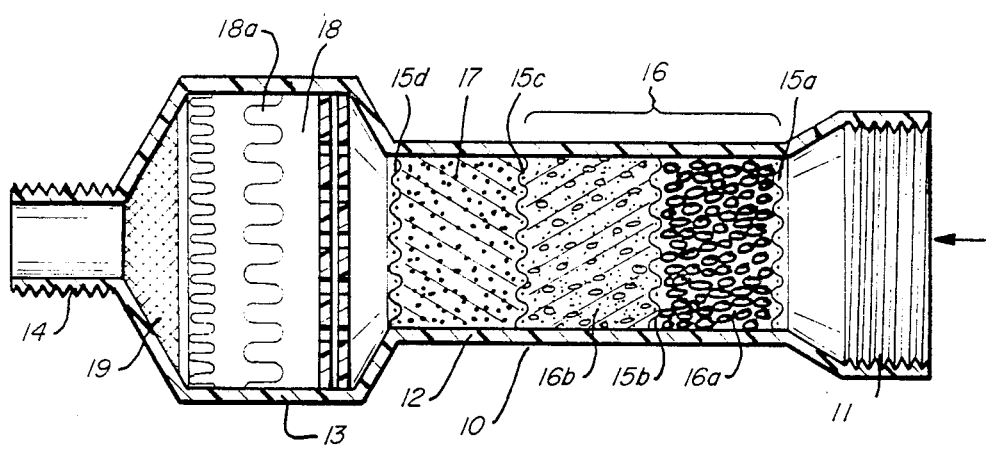
FIG. 2 is a section view of the module of this invention showing the zones through which the cleaning water passes.

Referring to FIG. 2, the water flow initially passes through first screening means 15a. The screening means is a mesh retainer placed at the inlet end of body 12 adjacent inlet 11 to remove particulates from the water. Water flow continues into a purification zone 16 which includes an organic matter removal zone 16a preferably containing activated carbon or a similar material to remove any organic matter in the water to continue purification of the water. After flowing, it is demineralized in zone 16b, preferably containing an ion exchange resin, which removes dissolved minerals or salts, thus decontaminating the water.

The selection of the materials to use in the purification zone 16 is a matter of choice depending upon the contamination expected in the water to be used for the cleaning job but normally an activated charcoal would be used to remove organics and on ion exchange resin used to remove minerals. The size of the zone for removal of organic material 16a and the demineralization zone 16b are also dictated by the contamination of the water. This is a particular advantage when the module of the invention is to be included in a kit with the tubing and other apparatus to be cleaned having a known destination. The modules then can be tailored to cope with the expected ecological conditions.

Upon leaving purification zone 16, flow continues into a detergent dispensing zone 17 containing a water soluble powdered cleaning compound which will dissolve into the water and be used for cleaning the tubing. The composition of the cleaning compound depends on the material or soil which is ultimately to be cleaned from the hose or tubing. Again, this can also be tailored to suit a particular need. After the water flows through the detergent dispensing zone it enters a filtration zone 18 housed in a filter holder 13 which generally is an enlarged diameter portion of the body 12. The decontaminated water is now laden with the soluble cleaning compound and ready for use to clean.

As the water flows into the filter holder 13, the cross-sectional area is normally increased as shown in FIG. 2. The filtration zone 18 has a larger cross-section area than the body 12 in order to slow the velocity and to reduce the pressure drop across the filter 18a in the filtration zone 18. The slower velocity prevents the filters from tearing or breaking due to high water pressure and allows the filters to effectively filter finely divided particles which might remain. While virtually any filter medium is appropriate a packed paper or fiber filter being preferred. The filters 18 in the filter holder 13 of the filtration zone 18 are preferably arranged in a decrementing manner to remove progressively smaller particulates.

Each zone of the module 10 within the body 12 is secured and separated by a screening means 15a, 15b, 15c and 15d to maintain the integrity of the purification zones 16 and the detergent dispensing zone 17. Screening means 15a is shown at the inlet end of body 12 to catch and remove larger particulates before they enter the purification zone 16.

After flowing through the filters, the water, laden with detergent, flows through a pad 19, which could also be part of the filter 18a, embedded with a pH indicator. This pad is viewable from the outside through a clear opening 20 (FIG. 1). The water eventually dissolves and carries away all the cleaning agent resulting in a change in pH of water which is reflected by a color change of the indicator pad 19 viewable through opening 20. Of course, a transparent or translucent material could be used for the body 12 through which the change in indicator color can be observed.

If desired, once the detergent has all been dissolved, the water supply may be shut off at the tap 8. If the detergent is still within the hose or tubing, stopping the water flow allows the cleaning compound to soak and react with the deposits being cleaned. When the cleaning compound is fully exhausted and water is flowing, the water is now rinsing the tubing and carrying away the removed deposits. The purification zone 16a and 16b should be of sufficient capacity to continue to remove organic matter and dissolved materials through the duration of the rinsing phase. Therefore, the sizes of zones 16a, 16b and 17 may not be equal but are dependent upon the amount of activated carbon, ion exchange resin, and cleaning compound needed to clean and rinse the tubing. Once cleaning and rinsing are complete the module can be removed from the cleaned tubing and water source and discarded. The cleaned tubing can then be put back into service from where it came until a subsequent cleaning is required.

We claim:

1. A tube cleaning module comprising:
   (a) one substantially cylindrical body containing, in sequence from a water inlet end to a water outlet end, a means for water purification, a detergent dispensing means for tube cleaning and a filtration means;
   (b) a first attachment means carried by the water inlet end of the body for attaching the body to a water source; and
   (c) a second attachment means carried by the outlet end of the body for attaching the tube to be cleaned.

2. The module of claim 1 wherein the water purification means includes a means for removal of organic matter from the water and a demineralization means for removing minerals and salts.

3. The module of claim 2 wherein the organic matter removal means contains activated charcoal and the demineralization means contains an ion exchange resin.

4. The module of claim 2 wherein the organic matter removal means and the demineralization means within the body are secured by a screening means.

5. The module of claim 4 wherein the filtration means of the body has a greater cross-section area than the water purification means.

6. The module of claim 5 wherein the filtration means includes an imbeded pH indicator means to show the exhaustion of detergent from the detergent dispensing means.

7. The module of claim 6 wherein the detergent dispensing means includes a powdered cleaning compound which dissolves into the water leaving the filter as a cleaner.

* * * * *